Feb. 14, 1939. M. S. RANDALL 2,147,059
AUTOMOBILE ROOF
Filed March 21, 1935
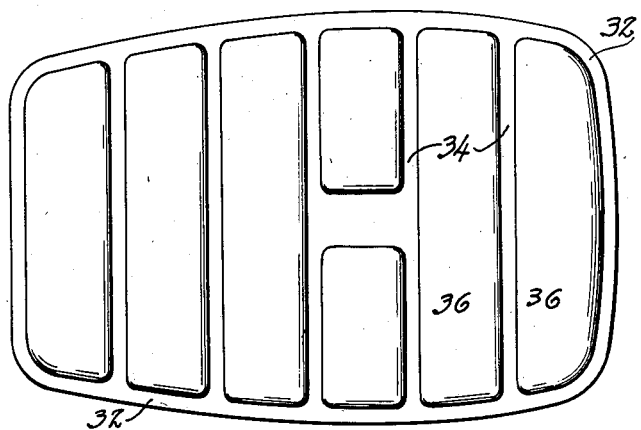
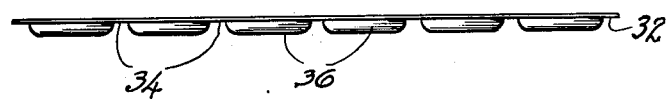
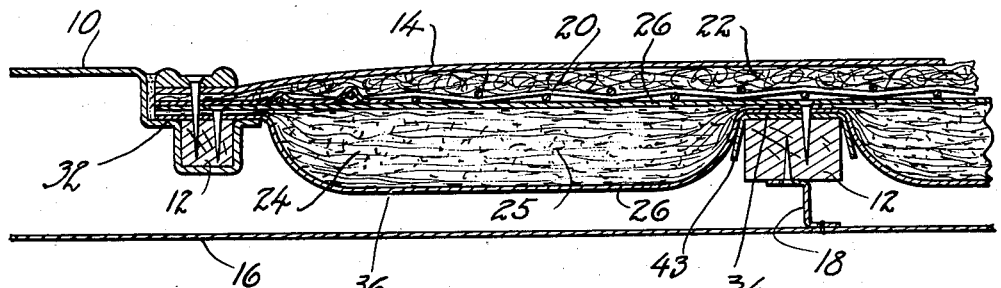
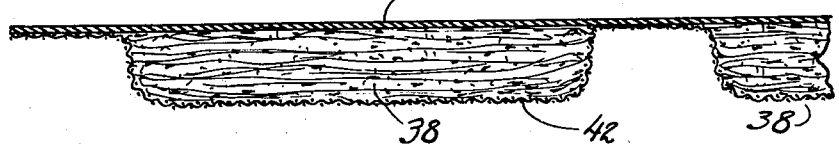
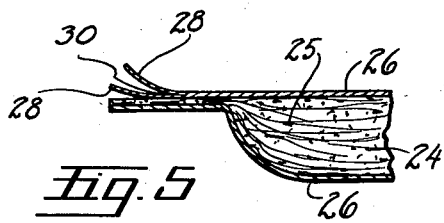
INVENTOR.
Meredith S. Randall
BY
Parker & Burton
ATTORNEYS.

Patented Feb. 14, 1939

2,147,059

UNITED STATES PATENT OFFICE 2,147,059

AUTOMOBILE ROOF

Meredith S. Randall, Detroit, Mich., assignor to Woodall Industries Incorporated, Detroit, Mich., a corporation of Michigan Application March 21, 1935, Serial No. 12,139

5 Claims. (Cl. 296—137).

My invention relates to improvements in laminated structural elements and particularly to such a structure adapted for use as an improved roof for an automobile, which roof is so constructed and arranged as to effectively insulate the interior of the vehicle body against heat or noise.

It is of a construction which facilitates its use in many places and particularly in connection with automobile interior insulation and is simple, inexpensive, and easily assembled in position. In automobile roof construction it is adapted to be used with the conventional automobile roof structure now employed, being so associated therewith as to be supported thereby. In a roof it comprises insulating pads of suitable material suspended between the bows of the framework of the roof underneath the upper outer deck material superimposing the interior trim material.

An important characteristic resides in the provision of an insulation pad formed of loosely integrated fluffy fibrous insulation material arranged between suitable outer protective layers to maintain the fluffy fibrous material in place. This pad is so assembled in the roof that it includes portions of high insulating capacity which are arranged within the spaces between the several roof bows.

The structure may be so formed that a multiplicity of individual insulating pads are suspended from a flexible supporting strip extending over the tops of the bows in such a manner that an individual pad is disposed within the space between each pair of bows. However, the structure may be formed in such a manner that the individual pad portions of high insulating capacity which are disposed between the several pairs of bows are unitary portions of an integral pad structure.

This pad structure preferably comprises an interior lamination of loosely integrated fluffy fibrous material having particles of thermoplastic binder material scattered therethrough. Preferably the individual fibers are coated with a film of the binder. The material is water resistant. This interior lamination is arranged between two outer laminations of flexible fibrous protective material. The outer protective laminations likewise preferably possess thermoplastic characteristics and are water resistant.

In a preferred form of construction a pad of these three laminations is made up full size for a roof and it is subjected to a stamping operation under heat as well as pressure whereby the interior fluffy lamination is compressed along transverse lines corresponding to the spacing of the roof bows upon which the pad is to be mounted. Along the lines of compression the pad is compacted providing uncompressed fluffy pad-like portions between the lines of compression. When the pad is arranged upon the roof bows the transverse compacted lines overlie the bows and the uncompressed pad-like portions are arranged between the bows as shown in Fig. 3.

A preferred practice is to compress the pad around its margin as well as along the transverse lines described and to use the strong compacted portions as the lines along which securing means are passed through the pad to fasten it to the supporting framework of the roof. When compacted the structure possesses considerable strength and durability which in an uncompressed state it does not have and the securing means are retained therein and the pad does not tear out at such points.

Other objects, advantages, and meritorious characteristics of my invention will more fully appear from the following description, appended claims, and accompanying drawing, wherein:

Figure 1 illustrates an embodiment of my improved roof pad in plan,

Fig. 2 illustrates the embodiment of Fig. 1 in side elevation,

Fig. 3 is a cross sectional view through an automobile roof, partly broken away, embodying my invention, Fig. 4 is a cross sectional view through a modified form of my improved insulating pad, and Fig. 5 is an enlarged fragmentary cross sectional view showing one form of pad construction.

In Fig. 3 an automobile roof is illustrated in cross section. In this roof the top of the steel body is indicated as 10, the roof bows as 12, the upper top decking as 14 and the inner layer of trim fabric as 16. This inner layer 16 is attached to the roof bows by straps 18. In a composite type of roof wire netting 20 is stretched across the tops of the bows and supports felt wadding 22 or the like as indicated and as is common practice. In a roof of the type which includes an outer upper sheet of metal I propose to support an insulating pad or pads between the bows as shown in this figure. These insulating pads or pad portions may be constructed as shown in Fig. 3 or Fig. 4 or in any other suitable manner.

A suitable construction is as shown in Fig. 3. In this construction there is an interior layer 24 of loosely integrated fluffy fibrous material, the cellulose fibers of which are of web-like texture loosely integrated together and carrying a multiplicity of small particles 25 of thermoplastic binder such as asphaltum or the like. This interior layer is disposed between two outer layers 26 of tough flexible fibrous protective material. A suitable product is a laminated paper product as shown in Fig. 5 wherein one of the two outer layers is shown as separated into two component parts in exaggerated size to illustrate the construction.

Each of these outer layers may be constructed as shown in the layer which is broken down in Fig. 5. It will be noted that this layer consists of two laminations of loose, flexible, extensible, double creped paper 28 secured together by a layer 30 of suitable adhesive, preferably a moisture resistant adhesive, such as an asphaltum compound. These outer protective layers 26 are arranged sandwich fashion upon opposite sides of the fluffy interior insulating lamination 24 as shown. The entire pad is then compacted as shown in Figs. 1, 2 and 3 around its margin 32 and transversely thereacross along line 34 forming separate pad like portions 36 adapted for disposition between the several pairs of bows.

As the pad is compacted under heat and pressure the thermoplastic particles serve to hold the fibers permanently compacted together throughout a compacted area or along the compacted lines and the asphalt 30 in the outer protective layer 26 migrates and serves to assist in performing the same function thereby producing a compacted area throughout which the entire pad is so compressed as to form a relatively thin but tough and strong area adapted to receive and retain therethrough fastening means such as nails or the like to secure the pad in place to the supporting frame of the roof.

A pad thus formed having a compressed marginal portion and compressed transverse line portions separating the pad lengthwise into a plurality of individual pad-like insulating areas is positioned upon the roof frame including the bows so that the cushion-like areas are disposed between the bows and the frame as shown. As illustrated in Fig. 3 the structure is of the character of Figs. 1, 2 and 5 above described and is disposed underneath the wire netting 20. The compacted longitudinal marginal portions of the pad are secured in place to the longitudinal side frame members of the roof structure which are not shown in the drawing but are of the conventional well-known character. This securement may be in the manner illustrated for attachment of the compacted transverse portions to the bows.

A modification is illustrated in Fig. 4 where separate pads 38 of the same fluffy fibrous insulation material are supported by a flexible fibrous or fabric layer 40 which may be of the same material as one of the layers 26 or other suitable material. K B board might be used. This is a composition fiber board carrying a substantial asphaltum content and is capable of being molded under heat and pressure. A layer of loosely woven fabric 42 such as cheese cloth, scrim, or the like is arranged underneath the pads 38 and adhesively secured to the layer 40 holding the pads in place as shown. This composite pad is adapted to be used in the same manner as described in connection with the pad of Figs. 1, 2 and 3 above. Strips of suitable material 43 may be laid over the bows 12 underneath the pad as shown in Fig. 3.

What I claim is:

1. An automobile roof having spaced apart supporting bows, top decking material covering the tops of said bows, a layer of wadding arranged on top of said bows underneath said top decking material, trim material covering the bottoms of said bows and a plurality of insulation pads supported within the spaces between said bows and between said wadding and trim material.

2. An automobile roof having spaced apart supporting bows, top decking material covering the tops of said bows, trim material covering the bottoms of said bows, an insulation pad formed of a lamination of loosely integrated fluffy fibrous material possessing high insulating capacity secured to an outer lamination of flexible protective material, said fluffy fibrous material being permanently adhesively compacted along its margin and along transverse lines corresponding with the relative position of the roof bows separating the pad into uncompressed pad-like areas, said pad supported upon said roof bows with the uncompressed pad-like areas depending between the bows and substantially filling the space therebetween and the compacted areas overlying and secured to the bows.

3. An automobile roof having spaced apart supporting bows, top decking material covering the tops of said bows, trim material covering the bottoms of said bows, a laminated insulation pad formed of an interior lamination of loosely integrated fluffy fibrous material possessing high insulating capacity arranged between two outer laminations of protective material, one outer lamination being formed of relatively tough and strong material and the other outer lamination being formed of relatively porous material, said insulation pad being compacted along its margin and along transverse lines corresponding to the relative position of the bows separating the pad into spaced apart transverse uncompacted pad like areas, said pad supported upon said bows with the compacted lines overlying the bows and the uncompacted pad like areas disposed within the intervals between the bows and the porous lamination of the pad disposed on the under side.

4. An insulation pad for an automobile roof having a supporting frame including cross frame members, said pad comprising an interior lamination of loosely integrated fibrous fluffy material arranged between two outer protective outer laminations, said pad being permanently compacted along its margin and along spaced apart transverse lines providing relatively tough strong compacted lines corresponding to the frame of the roof and adapted to seat thereon and surrounding spaced apart uncompressed areas adapted to be disposed within the thickness of the frame between said frame members, said fluffy interior lamination being permanently adhesively secured compacted together along said lines.

5. In an automobile roof having a marginal frame and cross bows, an insulation pad comprising a lamination of loosely integrated fibrous fluffy sound absorbing material possessing thermoplastic characteristics and a tough fibrous protective supporting lamination possessing thermoplastic characteristics, said two laminations being permanently thermoplastically compacted along their margins and along spaced apart transverse lines corresponding with the position of the bows providing relatively tough strong compacted lines corresponding to the frame of the roof and the cross bows and adapted to seat thereon and surrounding spaced apart uncompressed areas adapted to be disposed within the thickness of the frame between said frame members, and securing means extending through said compacted areas into the frame securing the pad thereto.

MEREDITH S. RANDALL.